US007475429B2

(12) United States Patent
Carro

(10) Patent No.: US 7,475,429 B2
(45) Date of Patent: Jan. 6, 2009

(54) METHOD OF INVISIBLY EMBEDDING INTO A TEXT DOCUMENT THE LICENSE IDENTIFICATION OF THE GENERATING LICENSED SOFTWARE

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 874 days.

(21) Appl. No.: 10/479,891

(22) PCT Filed: Jun. 4, 2002

(86) PCT No.: PCT/EP02/06927

§ 371 (c)(1),
(2), (4) Date: Dec. 1, 2003

(87) PCT Pub. No.: WO02/101521

PCT Pub. Date: Dec. 19, 2002

(65) Prior Publication Data

US 2005/0262034 A1    Nov. 24, 2005

(30) Foreign Application Priority Data

Jun. 12, 2001   (EP)   ................... 01480049

(51) Int. Cl.
*G06F 7/04* (2006.01)
(52) U.S. Cl. ......................... 726/30; 713/179
(58) Field of Classification Search ........... None
See application file for complete search history.

(56) References Cited

U.S. PATENT DOCUMENTS

| 5,499,294 | A |   | 3/1996  | Friedman ................ 380/10 |
| 5,629,770 | A |   | 5/1997  | Brassil et al. ........... 358/261.1 |
| 5,958,051 | A |   | 9/1999  | Renaud et al. ........... 713/200 |
| 5,995,625 | A | * | 11/1999 | Sudia et al. ............. 705/51 |
| 6,487,301 | B1 | * | 11/2002 | Zhao .................... 382/100 |

(Continued)

FOREIGN PATENT DOCUMENTS

WO    WO 97/14087    4/1997

(Continued)

OTHER PUBLICATIONS

U.S. Appl. No. 09/333,632, incorporated by reference in US Patent 6769061.*

(Continued)

*Primary Examiner*—Emmanuel L Moise
*Assistant Examiner*—David J Pearson
(74) *Attorney, Agent, or Firm*—Schmeiser, Olsen & Watts; William H. Steinberg

(57) ABSTRACT

Method of invisibly embedding into a text document generated by a licensed software the License Identification Signature of the software wherein each original copy of the software has been assigned a unique Software License Code (SLC) and a unique License Identification Key (LIK) by a Licensing Authority, such a method comprising the steps of computing a Document Hash Value (DHV) of the text document (12), getting from the DHV a License Identification Code (LIC) of the text document by using the LUK (14), and embedding (18) invisibly into the text document the License Identification Signature (LIS) formed by the SLC, DHV and LIC after the LIS has been encoded by using character attributes.

1 Claim, 4 Drawing Sheets

U.S. PATENT DOCUMENTS 6,769,061 B1 * 7/2004 Ahern .................. 713/176
2001/0051996 A1 * 12/2001 Cooper et al. .......... 709/217

FOREIGN PATENT DOCUMENTS

WO     WO 00/77677 A2    6/2000

OTHER PUBLICATIONS

Bender et al. "Techniques for Data Hiding," *IBM Systems Journal*, vol 35, Nos. 3-4, 1996 pp. 313-335.

Brassil et al "Electronic Marking and Identification Techniques to Discourage Document Copying," *IEEE Journal on Selected Areas in Communications,* vol. 13, No. 8, Oct. 1995, pp. 1495-1503.

Dittman et al. "H2O4M—Watermarking for Media: Classification, Quality Evaluation, Design Improvements," *Proceedings of the 2000 ACM Workshops on Multimedia*, pp. 107-110 (2000).

Kohl et al. "Security for the Digital Library-Protecting Documents Rather than Channels," *Database and Expert Systems Applications.* Aug. 26-28, 1998, pp. 316-321.

Krawczyk et al. "HMAC: Keyed-Hashing for Message Authentication," Feb. 1997, pp. 1-11.

Lacy et al. "Music on the Internet and the Intellectual Property Protection Program," *ISIE '97*, Jul. 7, 1997.

"Secure Hash Standard," Federal Information Processing Standards Publication 180-1. Apr. 17, 1995, pp. 1-18.

Su et al. "Digital Watermarking of Text, Image, and Video Documents," *Computers and Graphics, Pergamon Press, Ltd.* vol. 22, No. 6, Dec. 1998.

International Search Report dated Aug. 22, 2003 for corresponding PCT application No. PCT/EP02/06927.

* cited by examiner

METHOD OF INVISIBLY EMBEDDING INTO A TEXT DOCUMENT THE LICENSE IDENTIFICATION OF THE GENERATING LICENSED SOFTWARE

RELATED APPLICATION

This application is a national stage application of and claims priority from PCT Application PCT/EP02/06927, filed Jun. 4, 2002, which claims priority from European Application No. 01480049.4, filed Jun. 12, 2001. These disclosures are hereby incorporated by reference herein in their entireties. The above PCT International Application was published in the English language and has International Publication No. WO 02/101521 A2.

TECHNICAL FIELD

The present invention relates to methods for licensed software protection through authentication of the text documents generated by a licensed software and relates in particular a method of invisibly embedding into a text document the license identification of the generating licensed software.

BACKGROUND

Software piracy is the theft of software through illegal copying of genuine programs or through counterfeiting and distribution of imitation software products or unauthorized versions of software products. Piracy can include casual copying of genuine software by individuals or businesses or widespread illegal duplication of software programs for profit.

By 1998, about 38% of the software in circulation worldwide was pirated, causing approximately $ 11 billion in loss to the global software industry. Software piracy is a particularly serious problem where the piracy rate is close to 100% such as in Japan or Popular Republic of China wherein respectively 92% and 94% of the software in use are pirated.

Worldwide, the software industry generates more than $ 28 billion in tax revenues annually. If piracy was eliminated, it is estimated that the industry would produce one additional million jobs by 2005 and contribute for $ 25 billion more in tax revenues. The economic losses caused by software piracy are impressive. On the United States, a study commissioned by the Business Software Alliance in 1999 found that: 25 percent of the of the business software applications installed on PCs were pirated and 107.000 jobs, $ 5.3 billion in wages, $ 1.8 billion in tax revenues were lost.

Without a global commitment to reducing piracy, the potential for world economic growth is seriously crippled. The high piracy rate inhibits the development of the software industry and precludes it from reaching its full worldwide potential by cheating legitimate software developers and companies of the rights and rewards of their hard-earned intellectual property. Thus, today the software industry as a whole is committed to help governments to meet the challenge of improving and enforcing intellectual property laws, and to educating the public about the importance of intellectual property rights in software. Contributing to the growing piracy rate are the disparate intellectual property and copyright laws of many countries coupled with the impressive growth and spread of the Internet. Although industry organizations (e.g., the "Business Software Alliance") have been successful in many of their efforts to defeat software piracy, governments around the world must improve their intellectual property laws and enforcement systems.

However, legal and law enforcement measures are costly and time-consuming, generally require access to host computers, being only suitable for large scale piracy. Thus, must techniques for protecting software are today directed towards making it more difficult to produce illegal copies of software. However, there is considerable resistance from final users to this approach, and computer hackers are pride in meeting the challenge of defeating the "lock". Other protection systems such as placing "time bombs" in programs that are activated if, by example, license fees are not timely paid are also not acceptable by users and can lead to a possible liability for destroying user assets.

Therefore, there is today a need for new protection techniques sufficiently secure to discourage attempts to defeat them and which do not require to inspect the host computer on which the software is run but instead protect the licensed software by enforcing the authentication of the documents generated by this software.

SUMMARY OF THE INVENTION

Accordingly, the main object of the invention is to achieve a method of invisibly embedding into a text document generated by a licensed software the license identification signature of this software while enabling the identification of unauthorized software copies without noticeably affecting the information contained in the document.

The invention relates therefore to a method of invisibly embedding into a text document generated by a licensed software the License Identification Signature of the software wherein each original copy of the software has been assigned a unique Software License Code (SLC) and a unique License Identification Key (LIK) by a Licensing Authority, such a method comprising the steps of computing a Document Hash Value (DHV) of the text document, getting from the DHV a License Identification Code (LIC) of the text document by using the LIK, and embedding invisibly into the text document the License Identification Signature (LIS) formed by the SLC, DHV and LIC after the LIS has been encoded by using character attributes.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

First of all, it is assumed that the licensed software to be protected (e.g. Lotus SmartSuite, Adobe Acrobat, MS Office, etc.) has been assigned by a Licensing Authority a unique Software License Code (SLC) (e.g. SLC=743955201446) and a unique secret License Identification Key (LIK) e.g.

(LIK=079455719322) used by the licensed software to mark each document generated by this software.

Figure 1:
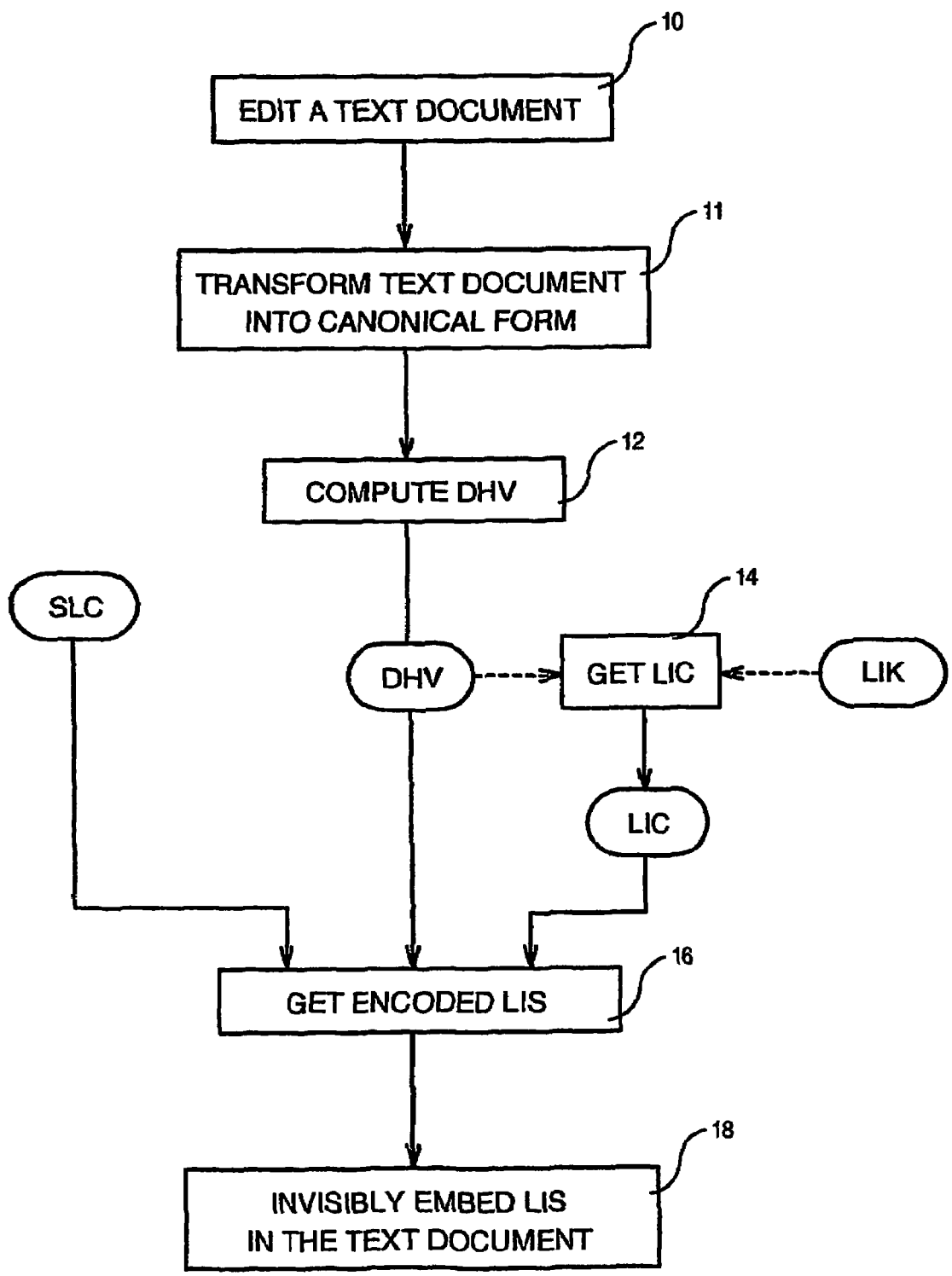
FIG. 1 is a flow chart of the method for embedding the license identification signature of a licensed software into a generated text document according to the invention.

According to the method of the invention illustrated by the flow chart of FIG. 1, after a text document generated by the licensed software has been edited (step 10), at least one part corresponding to the information to be used for encoding, and in the preferred embodiment, all the text document, is transformed into canonical form by setting all "spaces" of the document to the same default value (step 11). Thus, with the selection of the Color attributes, the color attribute is set to the BLACK Color for all space characters. In such a case, all space characters have by default the WHITE attribute for the background. Note that setting a default value on any space character means that no information has been encoded on this space.

Then, a Document Hash Value (DHV) is computed (step 12) by means of a one-way hash function (e.g. by means of the MD5 or SHA-1 hashing algorithms). Then, by means of any one of different types of cryptographic hash function (e.g. The HMAC algorithm), and using LIK as a key, a cryptographic digest of DHV, that is a License Identification Code (LIC) is computed (step 14).

Figure 2:
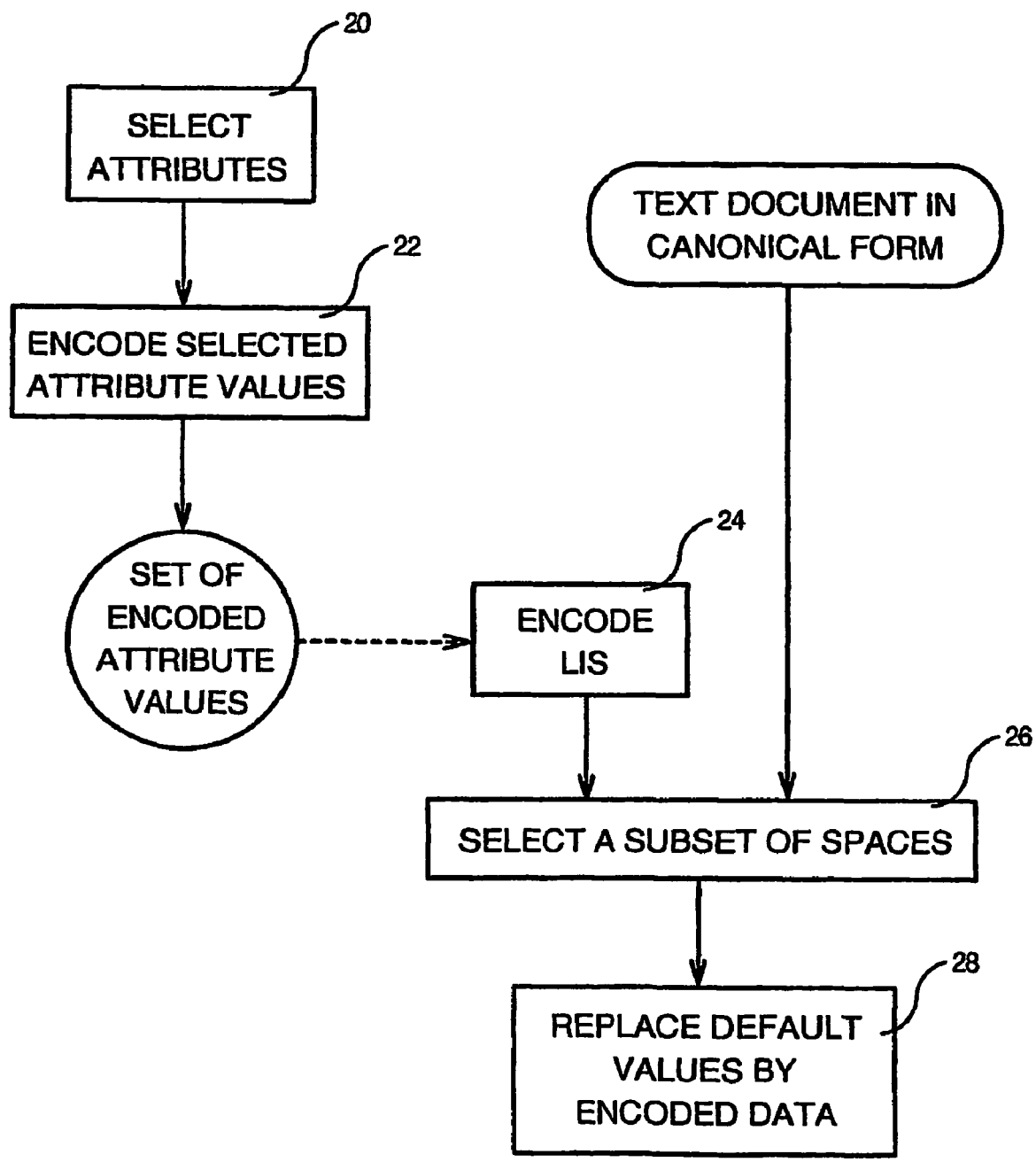
FIG. 2 is a flow chart of a preferred method for embedding the License Identification Signature into the text document.

The gathering of SLC, DHV and LIC constitutes the License Identification Signature (LIS) (step 16) which is invisibly encoded and embedded into the text document (step 18). The latter step is preferably achieved by using a method consisting in modifying default text properties on subsets of inter-word blanks as illustrated in FIG. 2.

According to this method, one or several attributes which are invisible on the space characters of the text document are selected (step 20). A preferred embodiment of the invention consists in selecting the single text color attribute. Thus, as many different choices as the number of colors in the palette of colors can be invisibly encoded in a single space of a text.

Then, a selected set of attribute values is encoded by establishing a correspondence or mapping table between the selected set of attribute values and the digits representing the data to be embedded (step 22).

| ENCODED VALUE | COLOR ATTRIBUTE |
|---|---|
| 1 | GRAY |
| 2 | DARK GRAY |
| 3 | RED |
| 4 | DARK RED |
| 5 | YELLOW |
| 6 | DARK YELLOW |
| 7 | GREEN |
| 8 | DARK GREEN |
| 9 | CYAN |
| 0 | DARK CYAN |
| NONE | BLACK |

Note that the color attribute could be combined with another attribute such as italic. The selection of the couple formed by text color and italic will enable to have as many different choices as the number of combinations of colors in the palette of colors and italic/non italic.

By using the text document already transformed into canonical form, the data to be embedded, that is the License Identification Signature (LIS), is then encoded by using the set of the encoded attribute values (step 24) to obtain an ordered set of attribute values.

Thus, assuming that the LIS is the following sequence of 32 decimal figures.

73350293214855841097644612360091 using the above correspondence or mapping table between the decimal figures and the color attribute values, results in the following ordered set of encoded attribute values.

GREEN(7), RED(3), RED(3), YELLOW(5), DARK CYAN(0), DARK GRAY(2), CYAN(9), RED(3), DARK GRAY(2), GRAY(1), DARK RED(4), DARK GREEN (8), YELLOW(5), DARK GREEN (8), DARK RED(4), GRAY (1), DARK CYAN (0), CYAN(9), GREEN(7), DARK YELLOW(6), DARK RED(4), DARK RED(4), DARK YELLOW (6), GRAY(1), DARK GRAY(2), RED(3), DARK YELLOW (6), DARK CYAN(0), DARK CYAN(0), CYAN(9), GRAY (1)

Lastly, after having selected the subset of spaces among the inter-word intervals of the text document to be used for encoding if this is not already done (step 26) (generally the consecutive intervals from the beginning of the text document), the default values of the attributes are replaced by the corresponding encoded attribute values of the ordered set of encoded attribute values for each space character of the selected subset of spaces (step 28).

As a result of the method according to the invention, the invisibly authenticated text is identical to the original text when displayed or printed. Moreover, since the License Identification Signature is embedded in the actual data, nobody can inadvertently misplace this information which always goes with an electronic version of the text document.

In the above example wherein the selected attribute is text color, there is no problem to encode data represented in the decimal base insofar as there are more than 10 colors to represent the decimal figures 0, 1 . . . 9. But, assuming that a different attribute is selected wherein there are less than 10 possible choices, such an attribute would not be useful for the data to be embedded in the decimal base. Even in such a case, it would be possible to use such an attribute provided that the data is represented according to a numerical base N lesser than the number of different possible attribute values. Thus, if there are 5 different possible choices for the selected attribute, the data will be represented in the 5-base with figures 0-4. Of course, such a representation of the data requires to reserve more spaces in the text document for encoding information than by using, for instance, a decimal base.

Another possibility to use an attribute allowed to take only a few number of different values is to combine it with another attribute. As an example, the above attribute taking 5 values could be combined with another attribute, such as italic/non italic, having two possible choices, to represent the 10 figures (0 to 9) of the data encoded in the decimal base.

For example, the following correspondence or mapping table associates a pair of attributes, for instance the color attribute and the italic/non-italic attribute, to hexadecimal digits:

| ENCODED VALUE | COLOR ATTRIBUTE | ITALIC ATTRIBUTE |
|---|---|---|
| 0 | CYAN | NO |
| 1 | DARK CYAN | NO |
| 2 | RED | NO |
| 3 | DARK RED | NO |
| 4 | YELLOW | NO |
| 5 | DARK YELLOW | NO |
| 6 | GREEN | NO |
| 7 | DARK GREEN | NO |
| 8 | CYAN | YES |
| 9 | DARK CYAN | YES |
| A | RED | YES |
| B | DARK RED | YES |

-continued

| ENCODED VALUE | COLOR ATTRIBUTE | ITALIC ATTRIBUTE |
|---|---|---|
| C | YELLOW | YES |
| D | DARK YELLOW | YES |
| E | GREEN | YES |
| F | DARK GREEN | YES |
| NONE | BLACK | Don't care |

It is important to note that, even if a system does not support colors (but only black and white texts), it would be even possible to encode invisible information on the blanks of a plain text by using for encoding for encoding one or a combination of several different possible attributes, like the font type, italic, bold or protected. Attributes.

Figure 3:
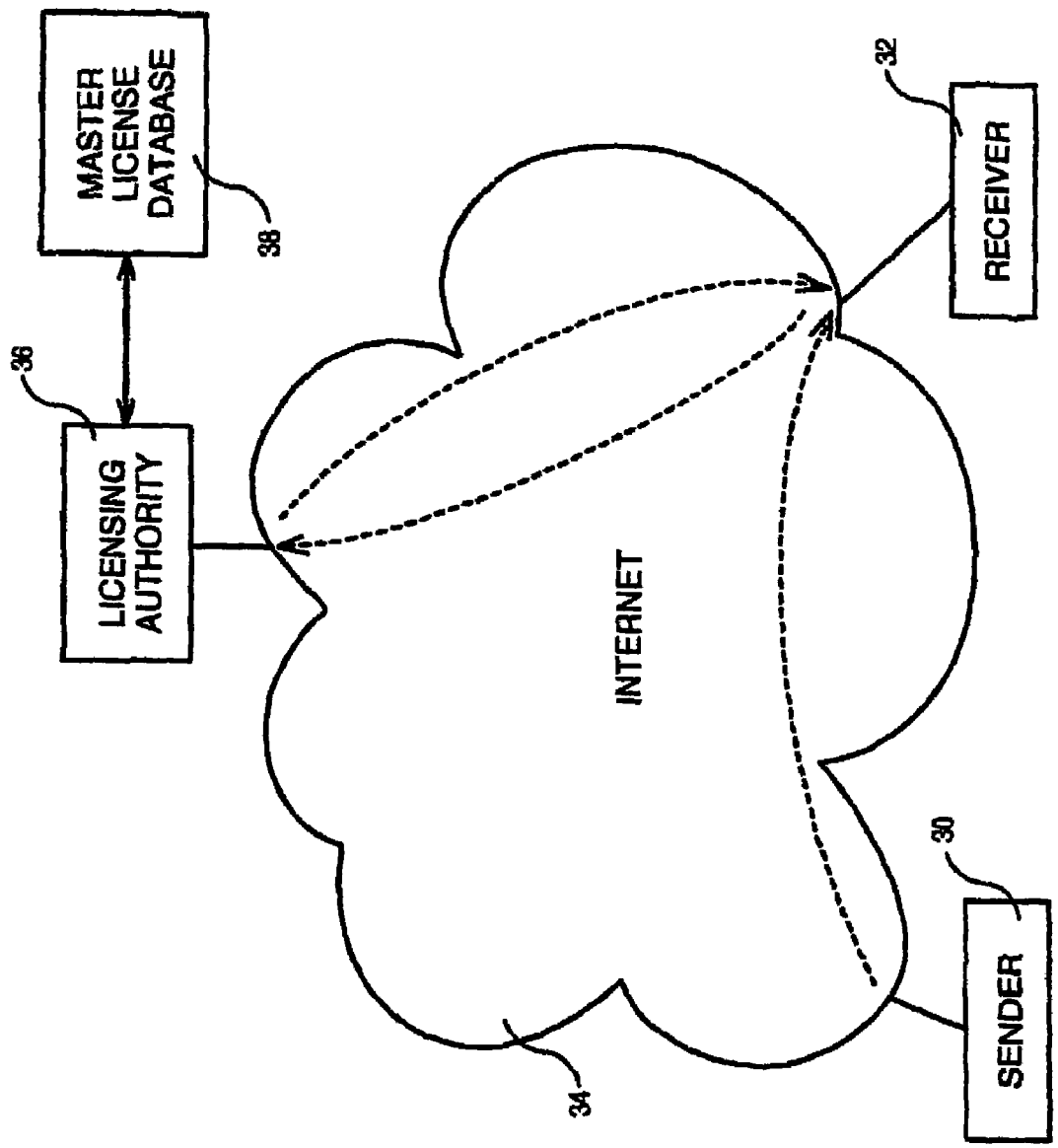
FIG. 3 is a schematic representation of a system wherein the authentication of a text document sent from a sender to a receiver is requested to a License Authority.

According to another aspect of the invention illustrated in FIG. 3, when the text document wherein is embedded the Licensed Identification Signature is forwarded by a sender 30 to a received 32 over a communication network such as Internet 34, it is sent for authentication to a Licensing Authority 36 which has a Master License Database 38 at its disposal. It must be noted that the sending communication system which transmits the document for checking to the Licensing Authority could be a network router.

Figure 4:
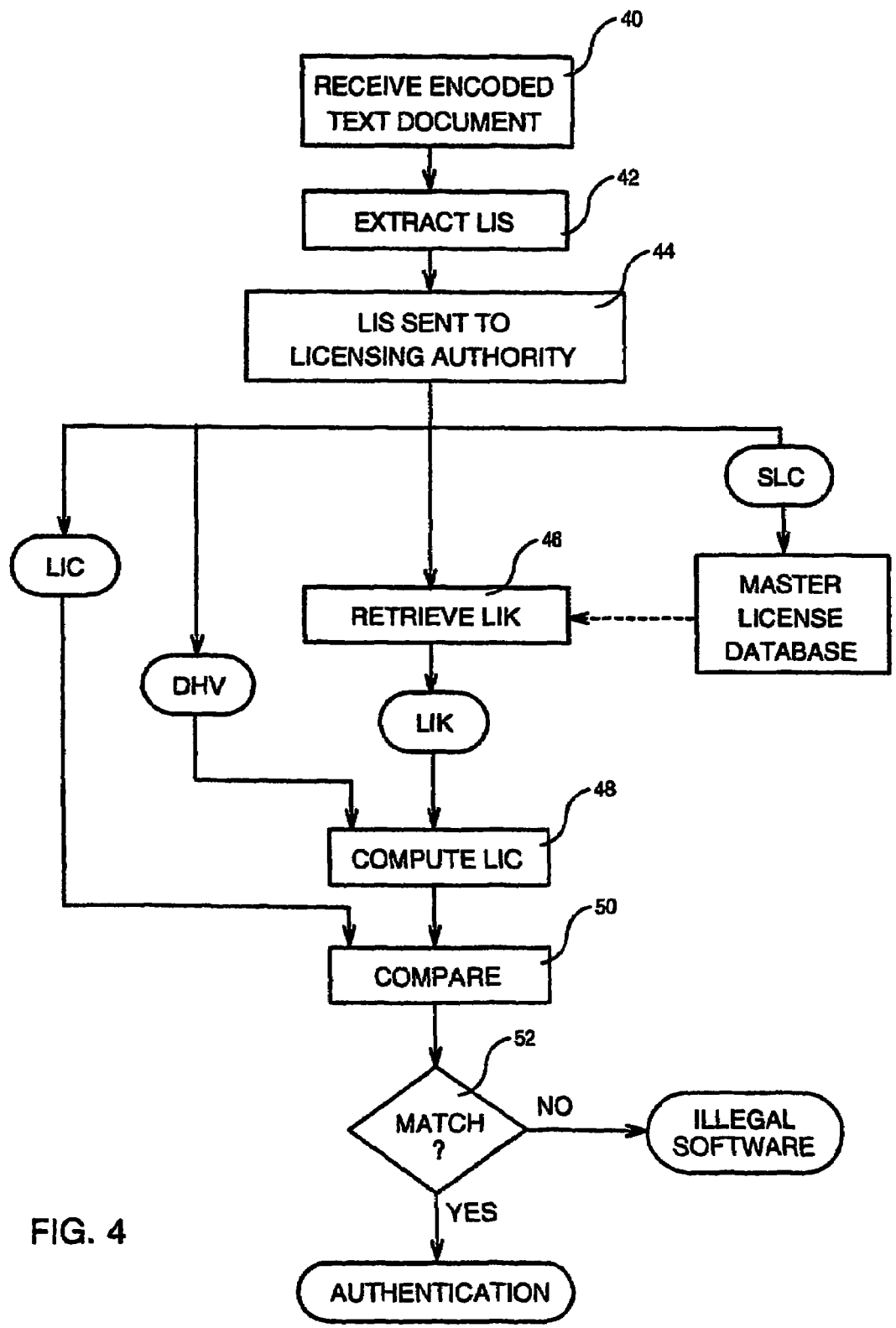
FIG. 4 is a flow chart of the method for doing by the License Authority, the authentication of a text document wherein an encoded License Identification Signature has been embedded according to the invention.

As represented in FIG. 4, after receiving the encoded text document (step 40) the receiver or any receiving communication system or the network router extracts (step 42) the License Identification Signature (LIS) from the received document. Thus, the three components of the LIS which are the Software License Code (SLC), the Document Hash Value (DHV) and the License Identification Code (LIC) are recovered and sent to the Licensing Authority (step 44).

From the received SLC, the Licensing Authority retrieves in the Master License Database the secret License Identification Key (LIK) (step 46) that corresponds to that particular license.

From the received DHV and using the retrieved LIK as a key and the same cryptographic hash function that was applied for generating this LIS (e.g. The HMAC algorithm), the true License Identification Code (LIC) that corresponds to this particular software license (SLC) and this document hash (DHV) is computed (step 48).

Then, the computed LIC is compared with the received LIC (step 50) to check whether there is a match between them (step 52). If so, there is authentication of the document. If not, the Licensing Authority determines that the licensed software copy that generated the document has been forged or that the document has been edited and modified by a different program, presumably in an attempt to defeat license identification.

In any case, the Licensing Authority notifies to the receiver the result of the verification, for example by informing if the verified LIS corresponds to an authenticated document or to an illegal software generated document, and optionally other information regarding the identity of the software license owner if registered in the Master License Database.

It must be noted that, by means of the invention, the invisible license identification signature formed by SLC, DHV and LIC is therefore reproduced on all documents generated by unauthorized copies of a software license, which can therefore be traced. Recovering the same "software license code" (SLC) on different and disparate documents from different users on different (and possibly remote) computers, indicates a possible violation of license terms and conditions and very likely the circulation of illegal copies of the same software license.

Also, if a document, presumably generated by the licensed software, is received by a final user without a license identification signature invisibly encoded on it, or with a wrong DHV, when computing the document's hash; or when an invalid SLC or an invalid LIC are detected on a license identification signature received by the licensing authority, then the software that generated the sample document is surely illegal, being thus compromised not only the authenticity and identity of the software, but also that of the sampled document.

Accordingly to a particular aspect of the invention, a system (e.g., a mail server, a router) which receives from a communication network documents generated by different brands of licensed software, automatically extracts from those documents their license identification signatures and sends them to the corresponding licensing authorities for verification. A customer service managed by the licensing authority automatically notifies to registered customers that receive documents from a communication network (e.g. The Internet) the results of verifications made on all documents sent from any remote user to those customers.

The invention claimed is:

1. A method of embedding into a text document generated by a licensed software a License Identification Signature of the software, the method comprising:
    converting all space characters of the text document to identical black space characters consisting of a black color;
    after said converting, computing a Document Hash Value (DHV) consisting of a one-way hash of the text document, wherein each original copy of the software has been assigned a unique Software License Code (SLC) and a unique License Identification Key (LIK) by a Licensing Authority;
    computing a License Identification Code (LIC) consisting of a cryptographic digest of the DHV by applying a cryptographic hash function to the DHV and using the LIK as a key;
    forming a License Identification Signature (LIS) consisting of the SLC, the DHV, and the LIC, said LIS consisting of digits expressed in base 5;
    forming an encoded LIS by mapping the digits of the LIS to corresponding character attributes, said encoded LIS consisting of the corresponding character attributes respectively corresponding to the digits of the LIS;
    embedding the corresponding character attributes into respective consecutive black space characters starting with the first black space character at the beginning of the text document.

* * * * *